United States Patent [19]

Kawakami

[11] Patent Number: 4,697,176
[45] Date of Patent: Sep. 29, 1987

[54] VIDEO SUPERIMPOSITION SYSTEM WITH CHROMA KEYING

[75] Inventor: Kiyotada Kawakami, Osaka, Japan

[73] Assignee: Sanyo Electric Co., Ltd., Japan

[21] Appl. No.: 891,698

[22] Filed: Jul. 29, 1986

[30] Foreign Application Priority Data

Aug. 6, 1985 [JP] Japan .................. 60-172753

[51] Int. Cl.⁴ .............................................. H04N 9/75
[52] U.S. Cl. ..................................... 340/723; 340/703
[58] Field of Search ............... 358/21 R, 22; 340/701, 340/703, 723

[56] References Cited

U.S. PATENT DOCUMENTS 4,149,184 4/1979 Giddings et al. ................. 340/703
4,413,273 11/1983 Wischermann ..................... 358/22
4,599,611 7/1986 Bowker et al. ..................... 340/721

Primary Examiner—John W. Shepperd
Attorney, Agent, or Firm—Darby & Darby

[57] ABSTRACT

A graphic decoder circuit for a compact disk player has a color signal generator (6) called a color look-up table (CLUT), which outputs RGB video signals stored in parts addressed by color code signals. The color code signals are simultaneously supplied to a decoder circuit (10), which in turn outputs switching signals (Ys) for superimposition only when specific color signals designated by switching means (11) are inputted. Thus, graphic information from the compact disk player formed by arbitrary colors can be superimposed on pictures obtained from a television receiver or the like.

2 Claims, 3 Drawing Figures

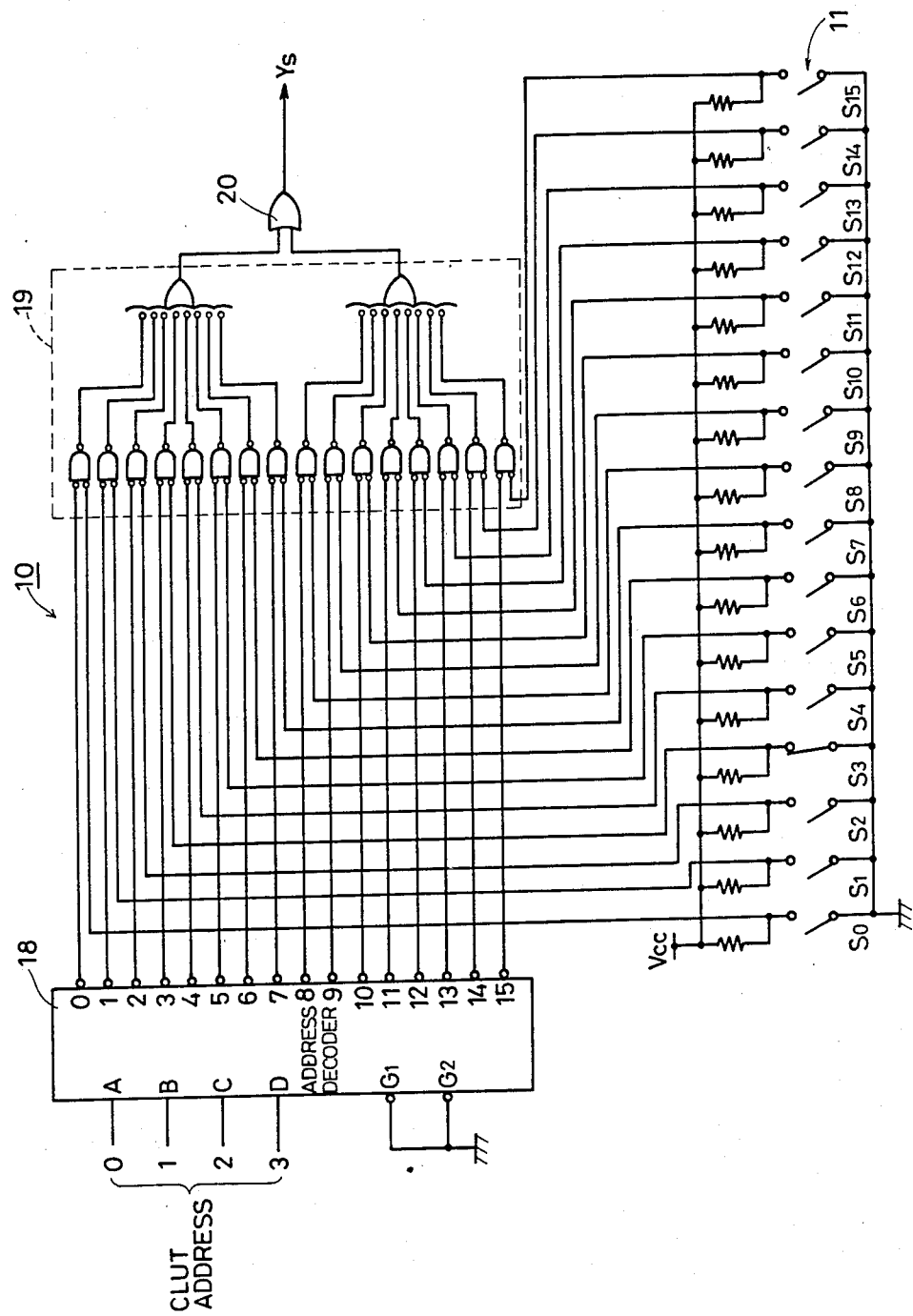

VIDEO SUPERIMPOSITION SYSTEM WITH CHROMA KEYING

BACKGROUND OF THE INVENTION

1. Field of the Invention

The present invention relates to a graphic decoder circuit for a compact disk player, which has a superimposing function of switching pictures based on RGB video signals obtained from a compact disk and pictures based on other video signals thereby to compose the pictures.

2. Description of the Prior Art

In a digital audio disk called a compact disk, signals called subcode signals are recorded in addition to digital audio signals. The subcode signals include information about numbers and counts as well as graphic information about still pictures.

On the other hand, pictures obtained from a personal computer are generally superimposed on pictures obtained from a television receiver or a video tape recorder, and such technique of superimposition is disclosed in, e.g., a magazine "Television Technique" June 1984, pp. 33–38. In such conventional technique, picture switching signals are produced on the basis of whether or not RGB video signals are obtained from a personal computer to switch pictures of the personal computer and those of a television receiver etc., and superimposition cannot be performed on arbitrary color signals in the RGB signals.

SUMMARY OF THE INVENTION

An object of the present invention is to provide a graphic decoder circuit which can superimpose RGB pictures obtained from a compact disk on pictures obtained from a television receiver, a video tape recorder or the like as well as obtain picture switching signals for the superimposition from arbitrary color signals in RGB video signals of the compact disk.

A graphic decoder circuit for a compact disk player generally has a color signal generator called a color look-up table (CLUT), which outputs RGB video signals stored in parts addressed by color code signals. The present invention is provided with a decoder circuit for decoding (selecting) the color code signals, to obtain picture switching signals from the output of the decoder circuit.

Assuming that the color code signals are four-bit ones, the same can designate $2^4=16$ colors stored in the color signal generator. Therefore, an arbitrary color can be selected from the 16 colors as that for picture switching by providing the decoder circuit with appropriate decoding function. The colors stored in the color signal generator can be varied. In other words, color tables can be varied. For example, an address (color code signal) "0001" can be for red in a color table while the same address "0001" can be for yellow in another color table. Thus, assuming that RGB video signals outputted from the color signal generator are formed by four bits each for red, green and blue, picture switching signals for $2^4 \times 2^4 \times 2^4 = 4096$ colors can be obtained from the output side of the decoder circuit for decoding (selecting) the four-bit color code signals.

According to the present invention, therefore, a picture switching signal for an arbitrary color can be obtained by a decoder circuit of simple structure. Further, a plurality of colors can be selected by picture switching signals.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows another definite circuit structure of a decoder circuit and a switching means.

DESCRIPTION OF THE PREFERRED EMBODIMENTS

Figure 1:
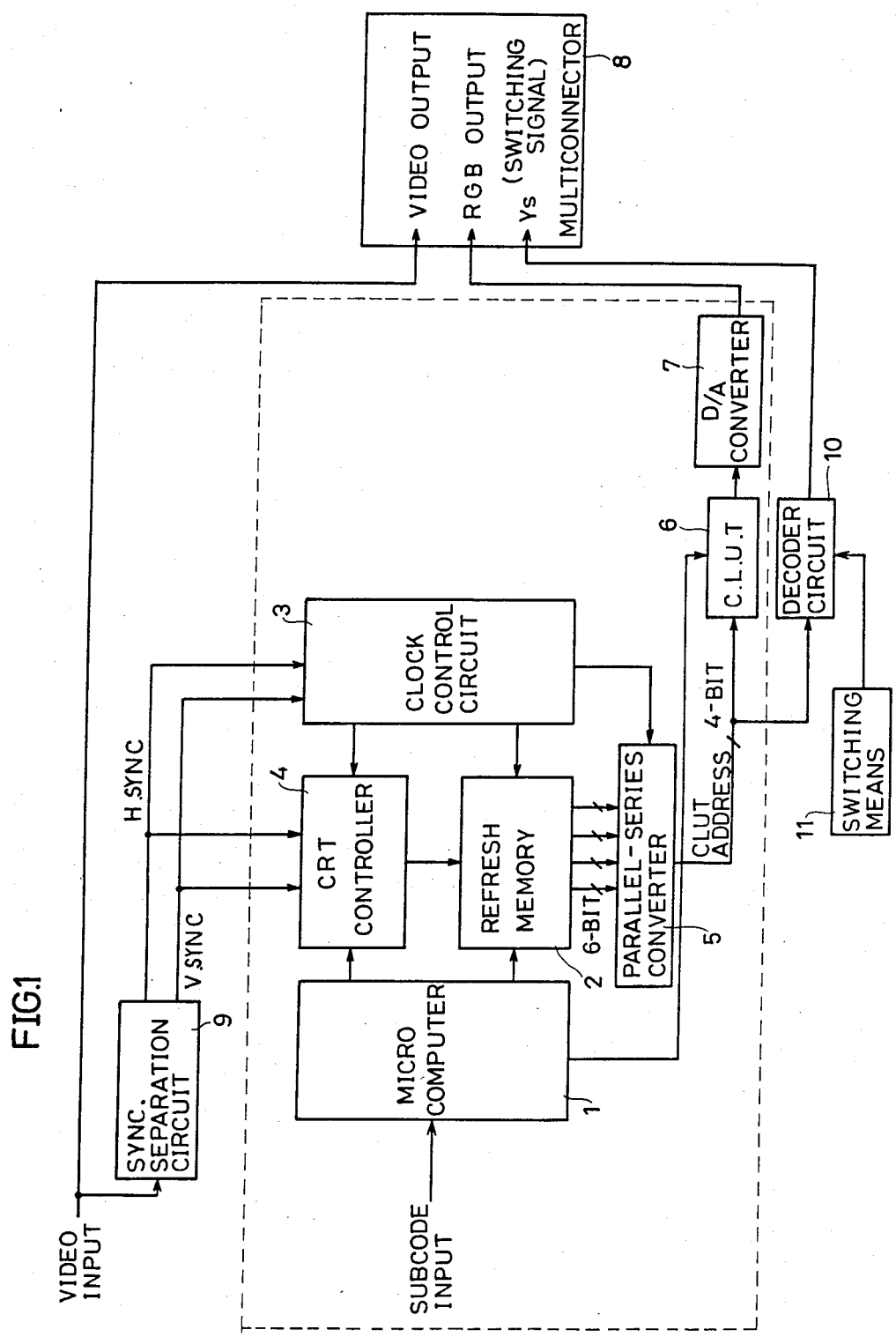
FIG. 1 shows a graphic decoder circuit according to an embodiment of the present invention.

FIG. 1 shows a graphic decoder circuit having a superimposing function according to an embodiment of the present invention and a part enclosed by broken lines is similar in structure to that of a conventional graphic decoder circuit. Subcode signals reproduced from a compact disk are applied to a microcomputer 1, which in turn processes various instructions designated by the subcode signals (R to W channel signals) and corrects errors so that picture data included in the subcode signals are written in a picture data refresh memory 2. The picture data written in the refresh memory 2 are read as 24-bit parallel signals on the basis of clocks generated from a clock control circuit 3 and a CRT controller 4 and supplied to a parallel-series converter 5 to be converted into four-bit color code signals. The color code signals are inputted in a color signal generator, i.e., a color look-up table (CLUT) 6 as address signals. A color table can designate $2^4=16$ colors. The colors stored in the CLUT 6 can be changed. In other words, a plurality of kinds of color look-up tables can be defined. Information for defining color look-up tables can be contained in the subcode signals. The CLUT 6 outputs RGB picture signals (four bits each for red, green and blue) corresponding to the designated addresses, which signals are converted into analog RGB signals by a D-A converter 7 to be inputted in a multiconnector 8. The multiconnector 8 also receives video signals including synchronizing signals, to superimpose pictures based on the video signals with those based on the analog RGB video signals. In order to perform such superimposition, the said pictures must be synchronized. Therefore, a synchronizing separation circuit 9 extracts horizontal and vertical synchronizing signals H.SNC and V.SNC from the video signals to apply the same to the clock control circuit 3 and the CRT controller 4 for reading the picture data from the refresh memory 2, whereby the clock control circuit 3 and the CRT controller 4 are driven synchronously with the both synchronizing signals.

The feature of the present invention resides in that a decoder circuit 10 is provided to produce picture switching signals Ys on the basis of the aforementioned color signals (CLUT addresses). A switching means 11 is adapted to designate the color code signals to be selected (decoded) by the decoder circuit 10. Upon appearance of the color code signals designated by the switching means 11, the output of the decoder circuit 10 goes high to serve as the picture switching signals Ys, which are also supplied to the multiconnector 8. The multiconnector 8 is in such structure of satisfying, e.g., EIAJ standard TTC-003. The video signals, the RGB video signals and the picture switching signals Ys are applied to a monitor television (not shown) through the multiconnector 8.

When the decoder circuit 10 detects the color code signals thus designated by the switching means 11, i.e., when the RGB video signals are in the designated colors, the RGB pictures in the parts of the said colors are superimposed on the pictures based on the video signals.

Figure 2:
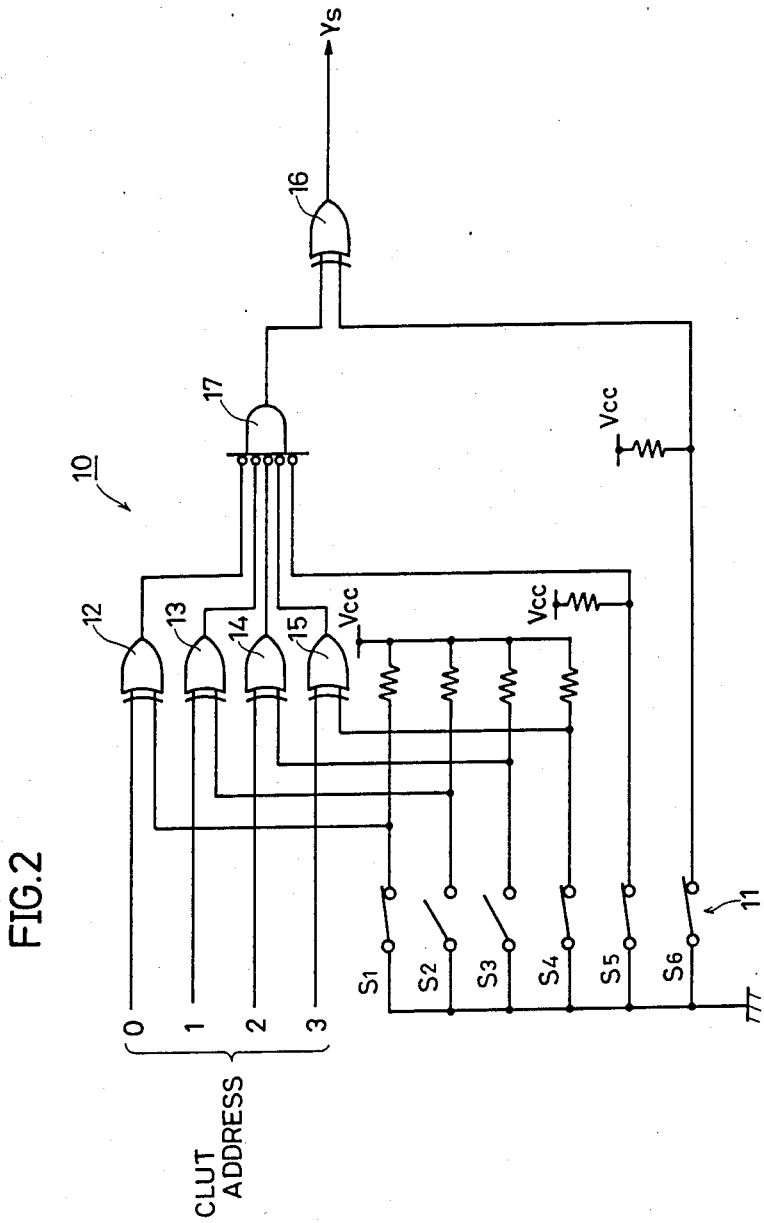
FIG. 2 shows definite circuit structure of a decoder circuit and a switching means.

FIG. 2 shows definite circuit structure of the decoder circuit 10 and the switching means 11. In this circuit, the decoder circuit 10 is formed by exclusive OR circuits 12 to 16 and a gate 17, and the switching means 11 is formed by six switches $S_1$ to $S_6$. The switches $S_1$ to $S_4$ are adapted to select colors for picture switching, and the switch $S_5$ is adapted to select whether superimposition is effectuated or invalidated. When the switch $S_5$ is set in an OFF position, one input of the gate 17 goes high and hence the output of the gate 17 is always at a low level regardless of set states of the switches $S_1$ to $S_4$ and no picture switching signal Ys is obtained. In other words, no superimposition is performed in this case.

When, for example, the switches $S_2$ and $S_3$ are set in OFF positions and the switches $S_1$ and $S_4$ are set in ON positions with the switch $S_5$ being set in an ON position, "0110" is selected as the color code signal, i.e., the CLUT address for picture switching. In this case, all input in the gate 17 goes low only when the CLUT address is "0110", and the output of the gate 17 goes high to obtain the picture switching signal Ys.

When, for example, the selected color is red and graphic information recorded in the subcode signal is about display of the words of a number recorded in the compact disk in red characters, the red characters are superimposed on the picture based on the video signal.

When the switch $S_6$ is set in an OFF position, the picture switching signal Ys is inverted in logic, whereby all of remaining 15 colors other than that designated by the switches $S_1$ to $S_4$ are selected for picture switching.

FIG. 3 shows another circuit structure of a decoder circuit 10 and a switching means 11. In this circuit, the decoder circuit 10 is formed by an address decoder 18, a gate group 19 and an OR gate 20, and the switching means 11 is formed by switches $S_0$ to $S_{15}$. When the CLUT address is, e.g., "0011", only a third terminal corresponding to the address outputs a low-level signal in the address decoder 18. Therefore, the switch $S_3$ is set in an ON position so that the OR gate 20 goes high when the CLUT address is "0011", to obtain a picture switching signal Ys.

In the circuit as shown in FIG. 3, a plurality of colors can be selected for picture switching by setting two or more of the switches $S_0$ to $S_{15}$ in ON positions.

Although the present invention has been described and illustrated in detail, it is clearly understood that the same is by way of illustration and example only and is not to be taken way of limitation, the spirit and scope of the present invention being limited only by the terms of the appended claims.

What is claimed is:

1. A graphic decoder circuit for generating picture switching signals to superimpose pictures based on RGB video signals obtained on the basis of color code signals recorded in a record medium on pictures based on other video signals, said graphic decoder circuit comprising:

color signal generation means addressed by said color code signals from said record medium for outputting said RGB video signals in correspondence to the designated addresses; and decoder means for decoding said color code signals to output said picture switching signals on the basis of specific color code signals, said decoder means including manually operable switching means for selecting one of said color code signals for producing said picture switching signal.

2. A graphic decoder circuit in accordance with claim 1, wherein said switching means further includes means for selecting a plurality of color code signals as said picture switching signals.

* * * * *